July 20, 1943.  J. H. HAGENGUTH  2,324,835
IMPULSE TESTER
Filed May 16, 1942

Inventor:
Julius H. Hagenguth,
by Harry E. Dunham
His Attorney.

Patented July 20, 1943

2,324,835

UNITED STATES PATENT OFFICE 2,324,835

IMPULSE TESTER

Julius H. Hagenguth, Pittsfield, Mass., assignor to General Electric Company, a corporation of New York Application May 16, 1942, Serial No. 443,214

4 Claims. (Cl. 175—183)

My invention relates to impulse testing arrangements particularly for insulators and other capacitative devices.

It is an object of my invention to provide an improved testing arrangement providing substantially identical wave shapes and wave crest voltage of the applied impulse for wide variations in capacity of the test specimen and for providing failure indication without the use of a cathode ray oscilloscope.

Another object of my invention is to provide an arrangement in which the impulse is automatically extinguished to facilitate very rapid testing with long tail impulse waves.

Other and further objects and advantages will become apparent as the description proceeds.

A better understanding of the invention will be afforded by the following detailed description considered in connection with the accompanying drawing, and those features of the invention which are believed to be novel and patentable will be pointed out in the claims appended hereto.

Figure 1:
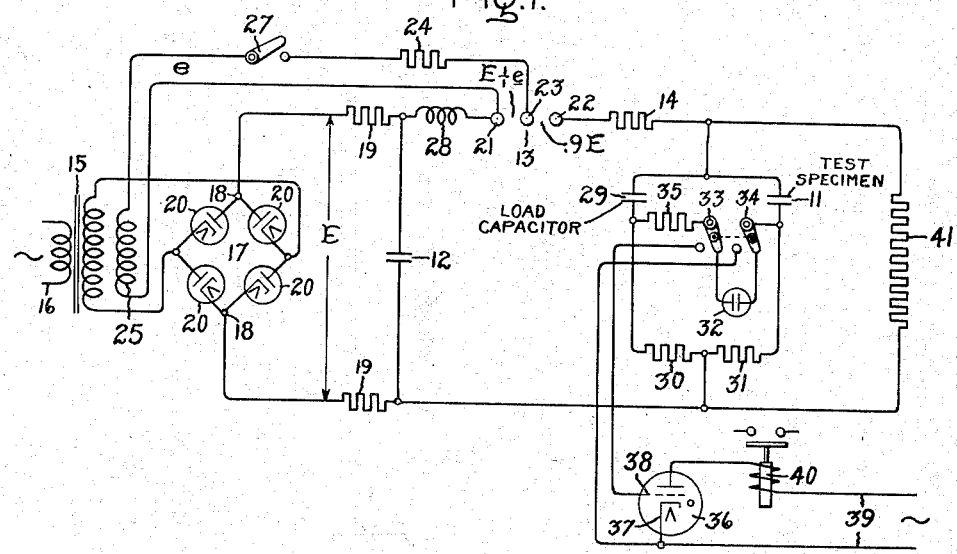
Figure 2:
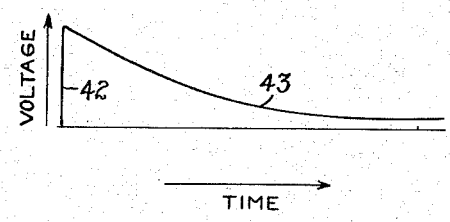

In the drawing Fig. 1 is a schematic diagram illustrating the electrical circuit of one embodiment of my invention, and Fig. 2 is a graph illustrating the impulse wave form.

In carrying out my invention in accordance with the preferred form, the circuit is arranged to apply steep-front long tail waves to a test specimen 11 which may take the form of high voltage cable, an insulator, a circuit breaker, a transformer bushing, capacitor, or the like. Since such devices have inherent capacity, the test specimen 11 is represented by the conventional symbol for a condenser.

The circuit for applying impulse waves to the test specimen 11, in the embodiment illustrated, comprises an impulse capacitance 12 connected to the specimen 11 in series with a three-electrode gap 13 and a damping resistor 14 for suppressing oscillations and controlling the steepness of the wave front. A suitable source of charging current is provided for the impulse capacitance 12 and the charging source may take the form of rectified direct current. For example, a step-up transformer 15 may be provided having a primary winding connected to a low-voltage alternating current source 16 and a secondary winding to which a rectifier 17 is connected having output terminals 18 connected to the impulse capacitance 12 in series with charging resistors 19. The rectifier 17 may be of any suitable well known type, being shown as a full wave rectifier consisting of electronic discharge units 20.

The three-electrode gap 13 comprises electrodes 21 and 22 and a center electrode 23. For initiating a discharge between the electrodes 21 and 22 the center electrode 23 is adapted to be connected to a source of initiating voltage through a resistor 24. The initiating voltage $e$ is made approximately equal to one-half the output voltage $E$ appearing between the output terminals 18 of the rectifier 17. The initiating voltage $e$ may be obtained, for example, by means of a tertiary winding 25 producing a peak voltage $e$. The winding 25 may be connected in series with a current-limiting resistor 24 to the end electrode 21 and the center electrode 23. For manually controlling the time of application of the initiating voltage $e$ a push button momentary-contact switch 27 may be provided in the connection.

The apparatus is designed for relatively high voltage tests and the voltage $E$ is preferably 1,000 volts or more. The spacing of the electrodes in the gap 13 is so chosen that the interelectrode space between the electrodes 21 and 23 breaks down at a voltage $E+e$ and the interelectrode space between the electrodes 22 and 23 breaks down at a voltage of $.9 E$.

The inherent inductance of the circuit is represented in the diagram by the inductance symbol 28, but the inherent circuit inductance is made as small as possible.

In order that substantially the same wave shape may be applied to the test specimen 11 regardless of the capacity of the test specimen throughout a wide range of capacitance, an additional capacitor 29 which may be referred to as a load capacitor is connected in a branch circuit paralleling the test specimen 11. Two non-inductive resistance shunts 30 and 31 are connected in series with the load capacitor 29 and the test specimen 11, respectively. For providing an indication of a defective test specimen or for indicating failure thereof, a failure indicating device 32 is provided. Such a device may be a voltage-responsive device and take the form of a neon bulb for visual observation or an electronic or ionic discharge device for relay operation. For example, a pair of double throw switches 33 and 34 may be provided with downward positions as shown for connecting the neon bulb 32 in series with a protective resistor 35 across the non-inductive shunts 30 and 31.

For relay operation an electric discharge device 36 of the thyratron type, for example, may be provided having a cathode 37 and a control electrode or grid 38 adapted to be connected in place of the neon bulb 32 when the double throw switches 33 and 34 are moved to the left. The electric discharge device 36 may be connected in series with a source of alternating or direct current 39 and a suitable device, such as an electric relay 40, in a conventional manner for causing the operation of other apparatus (not shown) in response to a failure of the test specimen 11.

For controlling the length of the tail of the impulse applied to the test specimen by controlling the length of discharge, a discharge resistor 41 is provided which is shunted across the branch circuits including the load capacitor 29 and the test specimen 11.

In order that the test specimen will be sure to break down if it is defective, I prefer to apply a relatively steep wave front such as 1.5-microsecond wave front, for example, and to make sure that the discharge will continue long enough to produce a visible indication by the neon tube 32, I prefer to utilize an impulse wave having a relatively long tail. The preferred wave shape of the test impulse is illustrated in Fig. 2 in which voltage is measured in a vertical direction and time in a horizontal direction. The portion 42 of the wave represents the steep wave front and the portion 43 represents the long tail. The condenser 29 serves both as a stabilizer of wave shape and a reservoir of available charge to insure failure of the test specimen once incipient failure starts.

The arrangement illustrated obviates the necessity for the use of an oscilloscope to determine wave shape and wave crest voltage for a wide range of capacitances of the test piece 11 provided the ratio of load capacitance 29 to test capacitance 11 is of the order of 10:1 or greater. It also supplants the oscilloscope to detect incipient failure of the test specimen. Certain such defects, for example, are manifested by excessive creepage current. The value of resistance in the damping resistor 14 which would be required to produce 1.5-microsecond wave front, were the condenser 29 not used, would cause such a large voltage drop with creepage current that there would be insufficient voltage to continue the failure to destruction and insufficient current in the test specimen to operate a simple failure indicator such as a neon tube.

It is clear from the drawing that under normal operation of the tester, currents of like polarity and of amplitude $$C\frac{dv}{dt}$$

are flowing from the resistor 14 through the capacitors 11 and 29, shunts 31 and 30, respectively, and back to the impulse capacitance 12. C represents condenser capacity, $v$ represents instantaneous voltage across the condenser and $t$ represents time. If the resistors 30 and 31 are balanced exactly inversely proportional to capacitance 29 and 11 the voltages across the resistors 30 and 31 will at all times be exactly of equal amplitude but of opposite polarity. The detecting device 32 or 36 connected across these resistors therefore will not indicate and can be made extremely sensitive. If the test specimen 11 failed, the failure current would be supplied instantly from the load capacitor 29 and current would flow through both resistors in the same direction, thus causing a voltage drop equal to the failure current, multiplied by the sum of the resistances of the shunts 30 and 31. Under this condition, an electric discharge device 36 can be made to operate on fault currents of the order of a few amperes.

Failure current will be supplied from the load capacitance 29 rather than from the impulse generator capacitor 12 because the impedance in the circuit 29—11—30—31 is considerably smaller than in the circuit 12—14—11—12 and therefore the maximum possible failure current amplitudes for the two circuits have a ratio of $$R_{14} \text{ to } \sqrt{\frac{L}{C}}$$

or in a practical case of 10:1, $R_{14}$ is the resistance of the resistor 14, L is the inherent inductance of the connections to the condenser 29 and C is the capacity of the condenser.

An unbalance in the exact ratio of the shunts 30 and 31 requires a less sensitive detecting device. For a neon tube 32, for instance, an unbalance of 5:1 or even more is tolerable and even for the more sensitive electric discharge device 36 an unbalance of 2:1 is tolerable. Such unbalance results, however, in loss of sensitivity of failure detection. Where for exact balance a failure current of, say, 10 amperes can be detected; with a 2:1 unbalance, 100 amperes failure current are required to permit detection. However, due to the presence of the load capacitance 29, small failures in the test piece 11 will rapidly develop into failures which will carry currents of the order of thousands of amperes, depending on the voltage used for testing. Therefore, even for use with an oscilloscope, the load capacitance 29 is beneficial for the conducting of tests which will insure definite failure and prevent passing of defective test specimens. Preferably the capacitance of the capacitor 29 is chosen to have a value approximately 10 times the maximum capacitance of the test specimens tested. The condenser 12 preferably has a capacity of the order of 10 times the load capacitor 29 or more to insure high regulation and a minimum loss of output voltage.

In order to increase the rapidity with which the test may be made by utilizing long wave impulses, the magnitude of the discharge resistor 41 is preferably made great enough to interrupt the discharge through the gap 13 automatically. The use of the discharge resistance 41 of suitable resistance has the further advantage that it causes the discharge to be extinguished a predetermined time after the initiation of the discharge in order that impulses of substantially identical wave shape may be applied to all specimens tested. Mass testing may be carried out whether the discharge resistance 41 is large or small. Nevertheless when the testing is performed with long waves the extinguishing feature is worth while because it provides a very rapid means of testing without drawing excessive charge from the impulse capacitor 12.

My invention is not limited to the use of a particular precise set of circuit constants. However, I have found that satisfactory results may be obtained by producing a wave with a 1.5-microsecond front and a long tail by utilizing a charging resistor 19 having resistances of 100,000 ohms or more with a charging source of 1,000 volts or more, utilizing a damping resistor 14 having a resistance between 25 and 50 ohms, a discharge resistor 41 having a resistance of 10,000 ohms or more and non-inductive shunts 30 and

31 having resistances of one-tenth ohm or less. With the gap spacings suggested and the value of 10,000 ohms or more for the discharge resistor, interruption of the discharge through the gap occurs on voltage crest. Test specimens ordinarily encountered have capacities varying from a few to 2,000 micromicrofarads.

I have herein shown and particularly described certain embodiments of my invention and certain methods of operation embraced therein for the purpose of explaining its practice and showing its application, but it will be obvious to those skilled in the art that many modifications and variations are possible, and I aim therefore to cover all such modifications and variations as fall within the scope of my invention which are defined in the appended claims.

What I claim as new and desire to secure by Letters Patent of the United States is:

1. An impulse tester for a capacitative test specimen comprising in combination with the specimen an impulse capacitance with a charging source, a three-electrode gap and a wave front controlling and oscillation damping resistor in series with the test specimen and the impulse capacitance, a first non-inductive resistance shunt also in series with the specimen, a load capacitor and a second non-inductive resistance shunt connected in series with a branch circuit paralleling the test specimen and the first shunt, said load capacitor having several times the capacity of the specimen, a failure responsive device connected across said shunts, and a discharge resistor paralleling said branch circuits, the resistance of said discharge resistor being relatively great in comparison to the resistance of the said damping resistor, the resistance of said shunts being relatively small in comparison with the resistance of said damping resistor.

2. An impulse tester for a capacitative test specimen comprising in combination with the specimen an impulse capacitor adapted to be charged by a source of unidirectional current, a discharge controlling gap and an oscillation damping resistor in series with the test specimen and the impulse capacitance, a first non-inductive resistance shunt also in series with the specimen, a load capacitor and a second non-inductive resistance shunt connected in series in a branch circuit paralleling the test specimen and the first shunt, said load capacitor having several times the capacitance of the specimen, and a failure responsive device connected across said shunts.

3. An impulse tester for a capacitative test specimen comprising in combination with the specimen, a low resistance element connected in series with the test specimen, mechanism for applying a relatively high direct current voltage impulse to said test specimen and said resistance element in series, a load capacitor and a second relatively low resistance element connected in series in a branch circuit paralleling said test specimen and said first low resistance element, a relatively high discharge resistor connected in a branch circuit also paralleling said test specimen and said first low resistance element, and a failure responsive device connected across said low resistance element.

4. An impulse tester for testing capacitance specimens comprising first and second parallel circuits, means for subjecting said parallel circuits to a unidirectional high voltage impulse, the first circuit containing the specimen to be tested and a resistance and the second circuit containing a capacitance and a resistance, the capacitance of the second circuit being several times the normal capacitance of the test specimen and the resistance of the first circuit being several times larger than the resistance of the second circuit such that if the capacitance of the test specimen is normal the impulse voltages across said resistances will be substantially equal, and a device responsive to the difference, if any, of the impulse voltages across said resistances.

JULIUS H. HAGENGUTH.